(12) United States Patent
Tochioka et al.

(10) Patent No.: US 6,552,095 B1
(45) Date of Patent: Apr. 22, 2003

(54) LAMINATE, METHOD FOR PRODUCING THE SAME AND THERMOPLASTIC FOAM ADHESIVE

(75) Inventors: Takahiro Tochioka, Aki-gun (JP); Kazuhisa Toh, Aki-gun (JP); Mitsuharu Kaneko, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 50 days.

(21) Appl. No.: 09/856,925

(22) PCT Filed: Sep. 28, 2000

(86) PCT No.: PCT/JP00/06698

§ 371 (c)(1), (2), (4) Date: May 30, 2001

(87) PCT Pub. No.: WO01/23178

PCT Pub. Date: Apr. 5, 2001

(30) Foreign Application Priority Data

Sep. 30, 1999 (JP) .............................. 11-278929
Sep. 26, 2000 (JP) ......................... 2000-292175

(51) Int. Cl.⁷ .............. C08J 9/22; C08J 9/224
(52) U.S. Cl. ............... 521/54; 428/309.9; 521/59; 521/139; 521/140
(58) Field of Search ............ 428/309.9; 521/54, 521/59, 139, 140

(56) References Cited

U.S. PATENT DOCUMENTS 3,615,975 A  10/1971  Gillern et al.
5,945,200 A  8/1999  Suzuki

FOREIGN PATENT DOCUMENTS

EP  0 711 658 A2  5/1996

OTHER PUBLICATIONS

Database WPI, Section Ch, Week 197917, Derwent Publications Ltd., London, GB; AN 1979–32176B, XP002157054 & JP 54 034383 A (Victor Co of Japan), Mar. 12, 1979, (Mar. 13, 1979), abstract.
Database WPI, Section Ch, Week 198604, Derwent Publications ltd.,London, GB; AN 1986–025669, XP002157055 & JP 60 248749 A (Toyoda Gosei KK), Dec. 9, 1985, abstract.
Database WPI Section Ch, Week 197917 Derwent Publications Ltd. London, GB; AN 1979–32176B XP002157054 & JP 54 034383 A (Victor Co of Japan) Mar. 13, 1979, abstract.
Database WPI Section Ch, Week 198604 Derwent Publications Ltd., London, GB; AN 1986–025669 XP002157055 & JP 60 248749 A (Toyoda Gosei KK), abstract.
Partial International Search (PCT/ISA/206).

*Primary Examiner*—Morton Foelak
(74) *Attorney, Agent, or Firm*—Nixon Peabody LLP; Donald R. Studebaker

(57) ABSTRACT

A laminate comprising a pair of thermoplastic resin members having fluctuation of clearance between the adhesion surfaces thereof, and a thermoplastic material foam layer which adheres the pair of the thermoplastic resin members. This laminate is formed from thermoplastic resin as a whole and can absorb the fluctuation of clearance between the members, and the thermoplastic resin members are firmly adhered with the thermoplastic material foam layer.

3 Claims, 3 Drawing Sheets

LAMINATE, METHOD FOR PRODUCING THE SAME AND THERMOPLASTIC FOAM ADHESIVE

TECHNICAL FIELD

The present invention relates to a laminate, a method for producing the same, and a thermoplastic foam adhesive. In particular, the present invention relates to a laminate comprising a pair of thermoplastic resin members having fluctuations in the clearance between their adhesion surfaces, which are adhered with a good adhesion strength, a method for producing such a laminate, and a thermoplastic foam adhesive which is used in the production of such a laminate.

BACKGROUND ART

As interior members of vehicles such as automobiles, laminated members comprising a skin material made of a vinyl chloride resin, which is laminated on a substrate using a polyurethane foam. The substrate is usually formed from an ABS resin, a modified polyphenylene ether resin, or polypropylene (cf. JP-B-5-1123, JP-A-8-48201, etc.) The polyurethane foam layer imparts cushioning feeling to the laminated members, absorbs the unevenness of the back surface of the skin material, and strongly adheres the skin material and the substrate. As described in JP-A-6-106682 and JP-A-7-214672, a laminate having an adhesive comprising a terpene resin, which is interposed between the skin material and the substrate to increase the adhesion strength between them, is also known.

Meanwhile, as part of the measures to protect the environment, it is required to increase a recycling rate of materials which construct automobiles, and it is the obligation to use parts at least 90% of which based on the weight of the automobiles can be recycled.

However, in the case of the conventional laminate members comprising the skin material of the vinyl chloride resin, the polyurethane foam and the ABS resin substrate, it is very difficult to separate the once laminated materials and recycle them, since the members comprise the different materials and, in addition, use the thermoplastic resin and the thermosetting resin at the same time, and they are firmly adhered. Thus, it may be contemplated that, when resinous materials which are used to produce interior and exterior members are unified in the same resin, the materials can be easily recycled and thus the recylcing rate can be increased.

JP-A-10-244885 discloses an interior member for a vehicle comprising a skin material, an intermediate foam layer and a core, all of which are made of polyolefin resins and a method for the production of such a member. However, the skin material, intermediate foam layer and core are all molded by a powder slush molding method, the foam layer cannot absorb the fluctuation of the clearance between the skin material and the core (substrate) due to the unevenness formed on the adhesion surfaces.

JP-A-60-248749 discloses a foam adhesive comprising a styrene-butadiene copolymer as a primary component. JP-A-2-199164 discloses a resin composition comprising a terpene-phenol resin to increase the adhesion between the resin composition for a skin material and a polyurethane foam. However, in this case, the resin composition may have decreased quality such as stickiness.

DISCLOSURE OF THE INVENTION

One object of the present invention is to provide a thermoplastic resin laminate, all the layers of which are formed from thermoplastic resins, which can absorb the fluctuation of the clearance between the layer members, and the layer members of which are strongly adhered.

Another object of the present invention is to provide a resinous laminate, substantially 100% of which can be recycled.

A further object of the present invention is to provide a method for producing such a thermoplastic resin laminate.

A yet further object of the present invention is to provide a thermoplastic foam adhesive which can be used to produce such a laminate.

According to the first aspect of the present invention, there is provided a laminate comprising a pair of thermoplastic resin members having fluctuation of clearance between the adhesion surfaces thereof, and a thermoplastic material foam layer which adheres said pair of the thermoplastic resin members.

According to the second aspect of the present invention, there is provided a method for producing a laminate comprising the steps of:

supplying an adhesive thermoplastic material containing a foaming agent in a space between adhesion surfaces of a pair of thermoplastic resin members having fluctuation of clearance between the adhesion surfaces, foaming said adhesive thermoplastic material, and adhering said pair of thermoplastic resin members with said adhesive thermoplastic material.

According to this production method, the laminate of the present invention, which has a substantially constant thickness, is recycled and has good cushioning properties, can be easily produced.

According to the third aspect of the present invention, there is provided a thermoplastic foam adhesive comprising a styrene-butadiene rubber, 3 to 10 wt. parts of microcapsules which contains a foaming agent and comprises a shell of a vinylidene chloride-acrylonitrile copolymer per 100 wt. parts of the adhesive, and a mixed solvent of toluene and cyclohexane, and having a solid content of 30 to 60 wt. %.

This thermoplastic adhesive is preferably used as the material of the thermoplastic material foam layer of the laminate of the present invention, or as an adhesive thermoplastic material used in the method for producing a laminate according to the present invention.

Herein, the "fluctuation of clearance" is intended to mean the fluctuation of the clearance between the adhesion surfaces of a pair of thermoplastic resin members caused by the unevenness on the adhesion surfaces. In the concrete, the present invention deals with the fluctuation of clearance generated by the surface roughness of the adhesion surface with the maximum height Rt of at least 7.0 µm, wherein the maximum height Rt of the surface roughness is determined by a distance between two lines which are drawn in parallel with the center line of the roughness curve in the region of the roughness curve cut out along the standard length to sandwich the region.

The laminate of the present invention has the characteristics such that its thickness is substantially constant, it can be recycled, and it has a high adhesion strength and also good cushioning properties. When the laminate has a thermoplastic resin foam layer, the cushioning properties are further improved, or the freedom of the selection of the material for the thermoplastic material foam layer increases, since the cushioning properties are attained by the thermoplastic resin foam layer.

In one preferred embodiment of the laminate according to the present invention, the thermoplastic resin foam layer is provided on the adhesion surface of the thermoplastic resin member on the skin side, and at least one of a terpene resin and a low molecular weight modified polyolefin is added only to the thermoplastic resin foam layer among the thermoplastic resin member and the thermoplastic resin foam layer. In this case, the adhesion strength can be increased without the deterioration of the quality such as the tackiness of the skin material, etc.

In another preferred embodiment of the laminate according to the present invention, the thermoplastic resin member on the skin side and the thermoplastic resin foam layer are molded by a powder slush molding method, and the amount of the terpene resin and/or the low molecular weight modified polyolefin to be added is from 3 to 20 wt. parts based on 100 wt. parts of the thermoplastic resin in the thermoplastic resin foam layer. In this case, the adhesion strength can be increased without the deterioration of the quality such as the tackiness of the skin material, etc.

In one preferred embodiment of the method of the present invention, at least one of the thermoplastic resin members is molded by a powder slush molding method. When the thermoplastic resin member is produced by powder slush molding, its thickness greatly fluctuated, and in turn its adhesion surface has large unevenness. Even in such a case, the method of the present invention has no disadvantage, since an adhesive thermoplastic material containing a foaming agent is used.

In another preferred embodiment of the method of the present invention, a layer of a thermoplastic resin containing a foaming agent is formed on the adhesion surface of at least one of the thermoplastic resin members, and foamed in the course of adhering the layer of the thermoplastic resin to the thermoplastic resin member. In this case, the cushioning properties of the laminate are further improved, or the freedom of the selection of the material for the adhesive thermoplastic material increases.

In a further preferred embodiment of the method of the present invention, at least one of the thermoplastic resin members is molded by powder slush molding and then the layer of the thermoplastic resin containing the foaming agent is also formed by powder slush molding. In this case, the laminate can be easily produced, and the fluctuation of the foaming of the thermoplastic resin containing the foaming agent is suppressed since a temperature distribution in the cavity of the mold can be narrowed because of the presence of the already molded thermoplastic resin member.

In a yet another preferred embodiment of the method of the present invention, a thermoplastic resin containing a foaming agent is applied on the adhesion surface of at least one of the thermoplastic resin members, and foamed in the course of adhering the layer of the thermoplastic resin to the thermoplastic resin member. In this case, the cushioning properties of the laminate are improved, or the freedom of the selection of the material for the adhesive thermoplastic material is increased.

In a further embodiment of the method of the present invention, a laminate is produced by the following steps:

1) providing a molding mold having the first and second molds,
2) setting one thermoplastic resin member, which has been molded by powder slush molding, in the first mold,
3) applying an adhesive thermoplastic material containing a foaming agent to the other thermoplastic resin member and setting the other thermoplastic resin member in the second mold, and
4) heating the adhesive thermoplastic material containing the foaming agent to foam the foaming agent, and closing the first and second molds so that a pair of the thermoplastic resin members are adhered with the adhesive thermoplastic material in the mold.

In this case, the heating is surely and easily carried out to foam the foaming agent, and the accuracy of the molding is increased.

In a further preferred embodiment of the method of the present invention, in the above step to set the thermoplastic member in the first mold, a layer of a thermoplastic resin containing a foaming agent is formed on the adhesion surface of at least one of the thermoplastic resin members which is molded by powder slush molding and heated to foam the foaming agent so that the layer and the thermoplastic resin member are adhered, and then the thermoplastic resin member carrying the foamed layer of the thermoplastic resin is set in the first mold. In this case, the cushioning properties of the laminate are improved, or the freedom of the selection of the material for the adhesive thermoplastic material is increased.

In a yet further preferred embodiment of the method of the present invention, at least one of a terpene resin and a low molecular weight modified polyolefin is added only to the thermoplastic resin containing the foaming agent. In this case, the adhesion strength can be increased without the deterioration of the quality such as the tackiness of the skin material, etc.

In a yet further preferred embodiment of the method of the present invention, when the first and second molds are being closed, the adhesion surface of the thermoplastic resin member carrying the adhesive thermoplastic material, which is set in the second mold, is heated. In this case, the impregnation of the adhesive is accelerated, and thus the adhesion strength is increased.

PREFERRED EMBODIMENTS FOR CARRYING OUT THE INVENTION

Figure 1A:
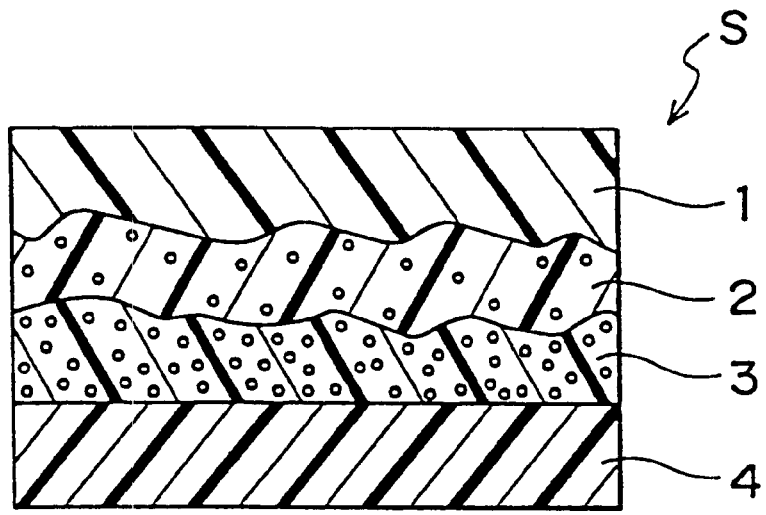
FIG. 1A is a vertical cross sectional view of one preferred example of the laminate of the present invention.

In the present invention, an olefinic thermoplastic foam adhesive comprising a styrene-butadiene rubber (styrene-butadiene copolymer) may be used as a material for the thermoplastic material foam layer in the laminate, or an adhesive thermoplastic material containing a foaming agent. Preferably the thermoplastic foam adhesive comprises 3 to 10 wt. parts of microcapsules containing a foaming agent and comprising a shell of a vinylidene chloride-acrylonitrile copolymer per 100 wt. parts of the adhesive, contains a mixed solvent of toluene and cyclohexane, and has a solid content of 30 to 60 wt. %. This type of the thermoplastic foam adhesive exerts the large adhesion strength, softens at a low temperature, and has good foaming and processing properties.

In one preferred example of the thermoplastic foam adhesive used in the present invention, the styrene-butadiene rubber comprises an acid-modified styrene-butadiene-styrene copolymer and also an isocyanate to crosslink the copolymer. In this example, the heat-resistant stiffness and the heat-resistant adhesion strength of the thermoplastic foam adhesive are increased.

In another preferred example of the thermoplastic foam adhesive, a weight ratio of vinylidene chloride to acrylonitrile in the vinylidene chloride-acrylonitrile copolymer is from 50:50 to 60:40. In this example, the foaming temperature can be lowered.

In the present invention, the thermoplastic foam adhesive is intended to be used in a laminate (laminated resin molded article) having a skin material comprising at least one layer of a thermoplastic resin, an adhesive foam layer comprising an olefin resin and a substrate, which are integrated.

The foam adhesives comprising the olefin resin may contain a styrene-butadiene copolymer, an acid-modified styrene-butadiene rubber (SBR) (e.g. a maleic anhydride-modified styrene-ethylene-butadiene-styrene copolymer (SEBS), etc.), a tackifier (e.g. α-pineneterpenephenol, alkylphneol resin comprising free carboxyl groups and phenyl esters (manufactured by Hoechst), cyclohexane/toluene, an acrylonitrile-vinylidene chloride foaming agent, crude methylenediphenyl isocyanate (MDI), and the like.

1. Structure of laminate

Firstly, the fundamental concept of the construction or structure of the laminate according to the present invention is explained.

As the thermoplastic resin constituting the thermoplastic resin members and the optional thermoplastic resin foam layer, any conventional thermoplastic resin may be used. Preferable examples of the thermoplastic resin include polyolefin (e.g. polypropylene, etc.), thermoplastic polyurethane, polyvinyl chloride, etc. Among them, polyolefin, in particular, polypropylene is preferred.

When one of the thermoplastic resin members is the skin material of an interior part or component, the thermoplastic resin is preferably a soft thermoplastic resin.

The thermoplastic resin of the thermoplastic resin member and that of the thermoplastic foam layer may be the same or different.

The typical combinations of the resinous materials are shown in Table 1.

TABLE 1

| | Combination | | |
|---|---|---|---|
| | 1 | 2 | 3 |
| Skin material/ foam | Thermoplastic polyolefin elastomer | Thermoplastic polyolefin elastomer | Polyvinyl chloride |
| Substrate | Polypropylene | Modified PPO[1]) resin | ABS resin |

| | Combination | | |
|---|---|---|---|
| | 4 | 5 | 6 |
| Skin material/ foam | Polyvinyl chloride | Thermoplastic polyurethane elastomer | Thermoplastic polyurethane elastomer |
| Substrate | ASA[2]) resin | Modified PPO[1]) resin | Hard thermoplastic polyurethane |

Notes:
[1])Polyphenylene oxide.
[2])Acrylonitrile-styrene-acrylate.

The thermoplastic material constituting the adhesive thermoplastic material which adhered the thermoplastic resin members may be any conventional adhesive thermoplastic resin. Preferable examples of the adhesive thermoplastic resin include styrene-olefin copolymers (e.g. styrene-butadiene copolymers, styrene-ethylene-butadiene-styrene copolymers, styrene-butadiene-styrene copolymers, etc.), chloroprene, acrylic resins (for aqueous adhesives), etc.

The foaming agent which is contained in the adhesive thermoplastic material or the thermoplastic resin layer may be any conventional foaming agent. The foaming agents include evaporation type foaming agents such as aliphatic hydrocarbons (e.g. pentane, neopentane, etc.), chlorohydrocarbons (e.g. methylene dichloride, etc.), fluorohydrocarbons (e.g. Freon®, etc.) and the like; and decomposition type foaming agents such as sodium bicarbonate, azide compounds, azodicarbonamide, and the like.

Furthermore, foaming beads comprising foaming agents encapsulated in polymer capsules, thermally foaming microcapsules, and the like may be used as the foaming agents.

Next, a specific construction or structure of the laminate (laminated resin molded article) according to the present invention is explained. Such a laminate may be used as a material of an instrument panel of an automobile.

As shown in FIG. 1A, the laminate S comprises the skin surface layer 1, the skin back surface layer 2 (the foam layer), the foam adhesive layer 3 comprising an olefin resin, and the PP (polypropylene) substrate 4, which are laminated in this order from the skin side to the substrate side. The skin surface layer 1 and the skin back surface layer 2 constitute the skin material F1 (see FIG. 2). Here, the skin surface layer 1 is one example of the "thermoplastic resin member" on the skin side, the skin back surface layer 2 is one example of the "thermoplastic resin foam layer", the foam adhesive layer 3 is one example of the "thermoplastic material foam layer", and the PP substrate 4 is one example of the other "thermoplastic resin member".

The skin surface layer 1 is formed by slush molding a TPO (thermoplastic olefin) resin powder, which is one of the thermoplastic olefin resins, as a raw material. For example, the TPO resin comprises polypropylene and at least 20 wt. % of a rubber component (crosslinked or partly crosslinked rubber) based on the weight of polypropylene.

The skin back surface layer 2 is integrally formed on the back surface of the skin surface layer 1 by powder slush molding. The skin back surface layer 2 may be a soft foam layer which is formed from a resin raw material containing the TPO resin powder, a foaming agent and a terpene phenol resin, which is a terpene resin by powder slush molding. Here, the terpene phenol resin may be contained in an amount of 3 wt. parts per 100 wt. parts of the TPO resin powder. The expansion ratio of the skin back surface layer 2 may be about 4 times. The TPO resin which forms the skin back surface layer 2 may be the same as the TPO which forms the skin surface layer 1.

The foam adhesive layer 3 comprises a styrene-butadiene copolymer, maleic anhydride-modified SEBS, α-pineneterpene-phenol, cyclohexane/toluene, and an acrylonitrile-vinylidene chloride foaming agent as main components. Furthermore, crude MDI as a crosslinking agent is compounded in an amount of 5 wt. parts per 100 wt. parts of the main components.

The PP substrate 4 is formed from a polypropylene (PP) resin, which is an olefin resin, by injection molding.

In the laminate S of FIG. 1A, the skin material consists of the skin surface layer 1 and the skin back surface layer 2, as described above.

Figure 1B:
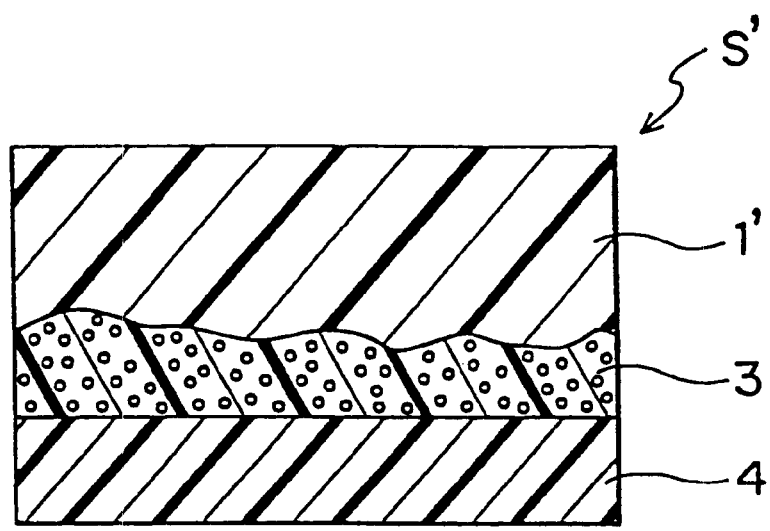
FIG. 1B is a vertical cross sectional view of another preferred example of the laminate of the present invention.

Alternatively, the skin material may consists of the skin surface layer 1' of the same composition as that of the skin surface layer 1 without the provision of the skin back surface layer 2, as shown in FIG. 1B. The laminate S' of FIG. 1B is also included in the present invention. The laminate S' can be very easily produced in comparison with the laminate S of FIG. 1A, although the former has slightly decreased adhesion and cushioning properties.

2. Production of laminate

The fundamental concept of the production method of the laminate according to the present invention is explained.

The laminate of the present invention may be produced by various methods. A preferred production method will be explained by making reference to a laminate comprising a skin material, a thermoplastic resin foam layer (an intermediate foam layer), an adhesive thermoplastic material foam layer (a foam adhesive layer) and a substrate.

An adhesive thermoplastic material containing a foaming agent (a foam adhesive material) is applied to the adhesion surface of the thermoplastic resin substrate.

Separately, a thermoplastic resin containing a foaming agent (a thermoplastic resin foaming composition) is applied to or laminated by powder slush molding on one surface of the thermoplastic resin sheet which forms the skin material. Then, the thermoplastic resin foaming composition is heated and foamed to form an intermediate foam layer.

The laminate of the skin material and the thermoplastic resin foam layer is set in the molding surface of a lower mold so that the skin material faces the molding surface, while the thermoplastic resin substrate coated with the foam adhesive material is set on the molding surface of an upper mold so that the substrate faces the molding surface.

During or after the foam adhesive material is foamed, the molds are closed until the clearance between them reaches a specific distance which depends on the thickness of the final laminate. In this step, the heating may be performed with a hot-air oven, far-infrared ray, near-infrared ray, etc. The heating temperature is suitably selected according to the kind of the foaming agent used.

Thereafter, the molded laminate in the molds is cooled, and the molds are opened. Then, the molded laminate is removed from the molds.

In another method, the laminate of the skin material and the thermoplastic resin foam layer, and the thermoplastic resin substrate coated with the foam adhesive material are set in the lower and uppermolds, respectively, and then, the molds are closed until the clearance of the molds reaches a certain distance. Thereafter, the molds are heated to foam the thermoplastic resin foaming composition and the foam adhesive material. In this method, the molds may be heated with a hot-air oven, steam, high-frequency induction heating, etc. The heating temperature is suitably selected according to the kind of the foaming agent used.

Thereafter, the molded laminate in the molds is cooled, and the molds are opened. Then, the molded laminate is removed from the molds.

According to the methods of the present invention, the fluctuation of the clearance between the thermoplastic resin members, for example, the skin material and the substrate of the instrument panel is absorbed. That is, when the adhesion surface of the skin material or the substrate has large unevenness, the sufficient adhesion surface area against the uneven surface can be retained since the foam adhesive material is foamed between the skin material and the substrate so that the foamed material surely penetrates into the depressed parts. Therefore, the adhesion strength between the members is improved, and the produced laminate has good cushioning properties.

The method of the present invention is particularly useful to adhere the thermoplastic resin member, which is produced by powder slush molding and thus has a back surface (a surface adhere to the substrate) with unevenness and which creates the large fluctuation of clearance when it is mated with the substrate having a flat surface.

When the thermoplastic resin foam layer is provided between the thermoplastic resin member and the adhesive thermoplastic material layer, the thermoplastic resin foam layer bears the cushioning properties, while the adhesive thermoplastic material layer bears the adhesion properties. Thus, the freedom of the selection of the resins increases.

The unevenness of the back surfaces of the thermoplastic resin members have no influence on the properties of the surfaces of the laminate, since the foam layer of the adhesive thermoplastic material and the optional thermoplastic resin foam layer absorb the fluctuation of clearance between the members. Accordingly, the laminate having the flat surface can be obtained insofar as the surface of the member is flat. When the surface of the member is embossed, the laminate which truly maintains the embossed designs can be obtained.

Next, a specific method for the production of a laminate (laminated resin molded article) according to the present invention will be explained by making reference to the laminate S of FIG. 1A.

Figure 2:
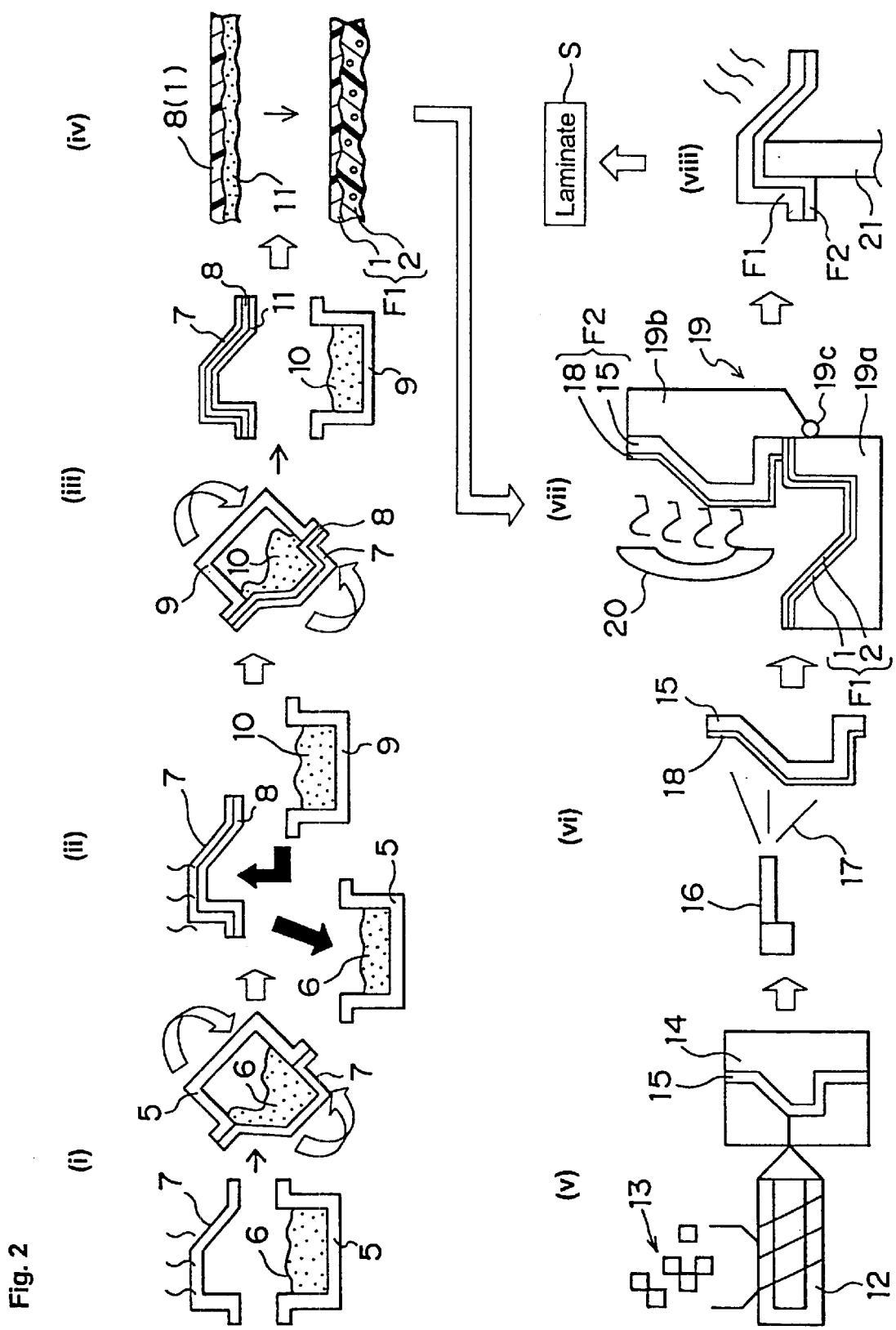
FIG. 2 is a process chart of a method for the production of the laminate of FIG. 1A or 1B according to the present invention.

As shown in FIG. 2, the production steps of the laminate S are roughly divided into the skin material-forming steps (i) to (iv) to form the skin material F1 consisting of the skin surface layer 1 and the skin back surface layer 2; the substrate-forming steps (v) and (vi) to form the substrate member F2 consisting of the foam adhesive layer 3 and the PP substrate 4; and the lamination steps (vii) and (viii) to finish the laminate S by adhering the skin material F1 and the substrate member F2.

Hereinafter, the procedures in the steps (i) through (viii) will be explained.

In the skin material-forming steps, firstly the powder 6 for the skin material, which is contained in the first container 5, is charged in the heated mold frame 7 in the step (i) (the skin material powdering step). In this step, the powder 6 for the skin material near the molding surface of the mold frame 7 softens or melts and adheres to the molding surface of the mold frame 7 to form the intermediate skin material 8.

In the step (ii) (the powder changing step), the excessive (unadhered) powder 6 for the skin material is returned to the container 5, and then the powder 10 for the foam containing a foaming agent (that is, a thermoplastic resin containing a foaming agent), which is contained in the second container 9, is provided.

In the step (iii) (the step for powdering to laminate a foam layer), the powder 10 for the foam contained in the second container 9 is charged in the mold frame 7 to which the intermediate skin material 8 has been adhered. In this step, the powder 10 for the foam, which is present near the intermediate skin material 8, adheres to the surface of the intermediate skin material 8 and forms the pre-foam layer 11. Then, the excessive (unadhered) powder 10 is returned to the second container 9.

In the step (iv) (the step for forming PP foam as the back surface of the PP skin material), the laminate consisting of the intermediate skin material 8 and the pre-foam layer 11 is removed from the mold frame 7. Then, the laminate is heated, and the foaming agent contained in the pre-foam layer 11 is foamed so that the pre-foam layer 11 forms the skin back surface layer 2 (the foam layer) of the skin material, while the intermediate skin material 8 forms the skin surface layer 1. Thus, the skin surface layer 1 and the skin back surface layer 2 form the skin material F1.

In the substrate-forming steps, firstly, the raw material (PP) pellets 13 supplied in the injector 12 are molten and injected in the cavity of the injection molding machine 14 in the step (v) (the injection molding step). Thus, the intermediate substrate 15 is formed.

Next, in the step (vi) (the step for applying the adhesive), the foam adhesive 17 comprising the olefin resin (the adhesive thermoplastic material containing the foaming agent) is spray coated with the applicator 16 on one surface of the intermediate substrate 15 (to which the skin material is adhered) to form the adhesive layer 18. The intermediate substrate 15 and the adhesive layer form the substrate F2.

In the lamination steps, firstly, the molding mold 19 consisting of the first mold 19a and the second mold 19b is provided in the step (vii) (the heating and foaming step). The first mold 19a and the second mold 19b are connected with the hinge 19c (which is not illustrated in detail) so that they can be freely opened and closed.

In the first mold 19a, the skin material F1 consisting of the skin surface layer 1 and the skin back surface layer 2, which has been formed in the above skin material-forming steps, is set. The skin material F1 is set in the first mold 19a using a vacuum suction means (not shown) equipped to the first mold 19a so that the skin surface layer 1 is in contact with the molding surface of the first mold 19a.

In the second mold 19b, the substrate F2 consisting of the intermediate substrate 15 and the adhesive layer 18, which has been produced in the above substrate-forming steps, is set, so that the intermediate substrate 15 is in contact with the molding surface of the second mold 19b.

Then, the far-infrared emanated from the far-infrared generator 20 is irradiated on the adhesive layer 18 of the substrate F2 so that the adhesive layer 18 is heated and foamed. During or after the foaming of the adhesive layer 18, the first mold 19a and the second mold 19b are closed. Thus, the surface material F1 and the substrate F2 are adhered in the mold 19. Thereby, the intermediate substrate 18 forms the PP substrate 4, while the adhesive layer 18 forms the foam adhesive layer 3.

In the step (vii), the heating of the adhesive layer 18 to foam the adhesive layer should be sufficient for removing the solvent from the adhesive layer 18 and completely foaming the foaming agent.

In the above embodiment, preferably, the heating temperature is about 110° C. and the heating time is about 10 minutes.

Thereafter, the molded article consisting of the skin material F1 and the substrate F2 (the almost finished laminate) is removed from the mold 19.

In the heating step (viii), the molded article consisting of the skin material F1 and the substrate F2 is mounted on the float 21 and conveyed in the hot-air heating apparatus (not shown), in which the whole molded article is heated. The heating in this step should be sufficient for improving the adhesion force between the skin back surface layer 2 and the foam adhesive layer 3 with the terpene phenol resin contained in the skin back surface layer 2. In this embodiment, preferably, the heating temperature is about 115° C. and the heating time is about 10 minutes. This heating causes the chemical reaction of crude MDI contained in the foam adhesive layer 3 and the terpene phenol resin contained in the skin back surface layer 2 to bond them. Thereby, the skin back surface 2 and the foam adhesive layer 3 (or the skin material F1 and the foam adhesive layer 3) are firmly adhered.

Finally, the molded article consisting of the skin material F1 and the substrate F2 is removed from the hot-air heating apparatus and spontaneously cooled to obtain the laminate S (for example, an instrument panel.

When the laminate S' of FIG. 1B comprising the skin material which consists of the skin surface layer 1' without the skin back surface layer 2 is produced, the steps (iii) and (vi) are skipped, and the intermediate skin material 8 formed in the step (ii) is supplied to the step (vii).

The above production method and the produced laminate S can achieve the following effects:

Since the foam adhesive layer 3 is formed of substantially the same olefin resin as the resin materials of the skin material F1 and the PP substrate 4, almost 100% of the laminate S (for example, the instrument panel) can be recycled (material recycle) in the laminated state without the separation of materials.

The adhesion of the skin back surface layer 2 and the foam adhesive layer 3 is much increased since the compatibility of the materials of the layers 2 and 3 is improved by the terpene phenol resin contained in the layer 2 and SBR (styrene-butadiene rubber) contained in the layer 3. If the skin back surface layer 2 is formed of a material which is less compatible with the foam adhesive layer 3, for example, the TPO resin, the adhesion of the skin back surface layer 2 and the foam adhesive layer 3 can be sufficiently maintained since the terpene phenol resin contained in the skin back surface layer 2 chemically reacts with crude MDI contained in the foam adhesive layer 3 in the heating step (viii) as described above.

In addition, the terpene phenol resin, which is added to the TPO resin as the main component of the skin back surface layer 2, has no adverse influence on the working environment, since it is a solid (powder) resin and can be compounded in the TPO resin without the use of organic solvents.

The skin material F1 and the substrate F2 can be firmly adhered by simply heating, in the step (viii), the molded article consisting of the skin material F1 and the substrate F2, which has been removed from the mold 19. Thus, the production equipment is less expensive than that used in the conventional methods in which the skin material and the substrate are adhered with applying the adhesive by spray coating or calendering. Furthermore, the method of the present invention is simplified and increases the productivity of the laminates since it excludes a masking step or a drying step after coating.

In general, the addition of the terpene phenol resin to the skin back surface layer 2 may decrease the moldability of the skin back surface layer 2. However, in the above embodiment of the laminate S, the decrease of the moldability is insignificant, since the amount of the terpene phenol resin is 3 wt. parts per 100 wt. parts of the TPO resin powder in the layer 2. In connection with the use of the terpene phenol resin, the appearance or looks of the skin back surface 2 is not deteriorated. Accordingly, the adhesion strength of the skin back surface layer 2 and the foam adhesive layer 3 can be satisfactorily increased without causing any incidental bad effects.

Table 2 shows the peel strength of the two laminates S1 and S2 of the present invention produced by the method as shown in FIG. 2, and that of a conventional laminate (comparative) which has a urethane foam layer between the skin material and the substrate, which is measured just after the adhesion, after 24 hour aging and after heat treatment.

"Failure" in Table 2 means that either the skin back surface layer 2 or the urethane layer was broken.

Here, the "peel strength" means a force allied in the direction perpendicular to the laminate surface, which is necessary to peel the skin material from the laminate having a specific width, for example, 25 mm. The larger the peel strength, the larger the adhesive strength. The unit "N/25 mm" in Table 2 means the force in Newton (N) necessary to peel the surface material from the laminate having a width of 25 mm.

TABLE 2

|  |  | Olefin foam adhesive layer | | Urethane foam adhesive layer |
|---|---|---|---|---|
|  |  | Laminate S1 | Laminate S2 |  |
| Just after adhesion | Peel strength (N/25 mm) | 6.4 | 4.9 | 1.0 |
|  | Condition | Failure in adhesive layer | Failure in Adhesive layer | No peeling at interface |
| After 24 hr. aging | Peel strength (N/25 mm) | 10.3 | 8.6 | 2.9 |
|  | Condition | Partial failure in skin back surface layer | Partial Failure in skin back surface layer | Failure of urethane |
| After heat treatment | Peel strength (N/25 mm) | 65.2 | 72.8 | 9.8 |
|  | Condition | Failure in skin back surface layer | Failure in skin back surface layer | Failure of urethane |

As can be seen from Table 2, the laminates S1 and S2 of the present invention have increased peel strength, that is, adhesion strength in comparison with the conventional laminate using the urethane foam layer. The adhesion strength is greatly increased after the heat treatment.

Hereinafter, the various modifications or variations of the laminate S shown in FIG. 1A (hereinafter referred to as the basic laminate S) and the production method shown in FIG. 2 (hereinafter referred to as the basic production method) will be explained.

In the basic laminate S and the production method of the same, the skin material has the two-ply structure consisting of the skin surface layer 1 and the skin back surface layer 2, which are formed by the powder slush molding method, although the skin material may have a multi-ply structure having three or more layers.

The skin back surface layer 2 may be a solid layer instead of the foam layer.

The foam adhesive layer 3 may be formed of a one-pack type adhesive which is not crosslinked.

The main component of the skin surface layer 1 or the skin back surface layer 2 is not limited to the TPO resin, and it may be a thermoplastic resin having low compatibility with the foam adhesive layer 3, for example, polyolefin (e.g. polyethylene, etc.), polyester, etc.

In the basic laminate S and the production method thereof, the terpene phenol resin is added to the thermoplastic resin as the main component of the skin back surface layer 2. In place of the terpene phenol resin, other terpene resin or a low molecular weight modified polyolefin may be added. Examples of the other terpene resin include maleinated terpene resins, maleic acid-modified terpene resins, etc. Examples of the low molecular weight modified polyolefin include low molecular weight maleic acid-modified polyethylene, low molecular weight maleic acid-modified polypropylene, low molecular weight carboxylic acid-modified polypropylene, low molecular weight hydroxyl group-modified polypropylene, etc. These resins may be used as a mixture of two or more of them. The amount of such a resin may be from 3 to 20 wt. parts per 100 wt. parts of the thermoplastic resin powder such as the TPO resin powder, as the main component of the skin back surface layer 2.

Table 3 shows the peel strength and the appearance (unevenness) of the laminates S produced by the basic production method using the terpene phenol resin in different amounts.

TABLE 3

| | Amount of terpene phenol resin added (wt. parts) | | | | | | | | | Evaluation criteria |
|---|---|---|---|---|---|---|---|---|---|---|
| Item | 0 | 1 | 2 | 3 | 4 | 5 | 10 | 15 | 20 | 25 | |
| Peeling strength[1] | X | X | X | ○ | ○ | ○ | ○ | ○ | ○ | ○ | ○: ≥10 N/25 mm |
|  | 0 | 5.0 | 8.0 | Failure of material | | | | | | | X: <10 N/25 mm |
| Appearance[1] | ○ | ○ | ○ | ○ | ○ | ○ | ○ | ○ | ○ | X | Visual observation ○: No unevenness X: Unevenness |

Notes:
[1]Peeling strength from the foam adhesive layer.
[2]Appearance of the skin surface layer.

The peel strength reported in Table 3 was measured with the laminate S having a width of 25 mm, and the unit of the peeling force was N (Newton). The "failure of material" in Table 3 means that the skin back surface layer 2 was broken.

As can be seen from Table 3, when the amount of the terpene phenol resin is less than 3 wt. parts, the adhesion strength between the skin back surface 2 and the foam adhesive layer 3 is low, and therefore the laminate cannot be practically used. When the amount of the terpene phenol resin exceeded 20 wt. parts, the appearance of the skin surface layer 1 deteriorates. The cause for the deterioration of the appearance or looks of the skin surface layer may be as follows:

When the amount of the terpene phenol resin or the low molecular weight modified polyolefin, which is added to the resin powder constituting the skin back surface layer 2, exceeds 20 wt. parts, the flowability (moldability) of the resin powder may decrease in the course of powder slush molding. Thus, a part of the resin powder of the skin back surface layer 2 may be molded in the form of particles so that the surface of the skin surface layer 1 tends to have unevenness, and therefore the appearance or looks of the skin surface layer deteriorates.

In the step (vii) (the heating and foaming step), the heating temperature and time to foam the adhesive layer may not be limited to those of the basic production method, and can be suitably selected according to the size and nature of the molded article (or the substrate F2), and so on.

Also, in the step (viii) (heat treatment), the heating temperature and time for heating the molded article (the skin material F1 and the substrate F2) may not be limited to those of the basic production method, and can be suitably selected according to the size and nature of the molded article, and so on.

Besides the instrument panel, the laminate S of the present invention may be applied to a door trim, a glove compartment lid, a console lid of an automobile, and the like.

The shape of the laminate S may not be limited to a convex or concave form as shown in FIG. 2, but may be a flat plate form.

In the step (vii) of the method for the production of the basic laminate S, the skin material F1 and the substrate F2 are set in the molds 19a and 19b, respectively, and the adhesive layer 18 of the substrate F2 set in the second mold 19b is irradiated with far-infrared ray to heat and foam the adhesive layer 18, while the molds 19a and 19b are opened. Alternatively, after the skin material F1 and the substrate F2 are set in the first mold 19a and the second mold 19b, respectively, the molds 19a and 19b are closed, and then the molded article is heated to heat and foam the adhesive layer 18 while the mold 19 is closed (closed foaming)

In the latter method, since the adhesive layer 18 is foamed after closing the mold 19, the foam adhesive layer 3 can thoroughly penetrate in the depressions of the unevenness on the back surface (the skin back surface layer 2) of the skin material F1. Therefore, the adhesion strength between the skin material F1 and the substrate F2 further increases. When the adhesive layer 18 is foamed at the same time as the mold closing, the flowability of the adhesive layer 18 increases. In addition, the molding cycle is shortened, the production steps are simplified, and thus the productivity increases.

3. Thermoplastic foam adhesive

Now, the preferred embodiment of the thermoplastic foam adhesive used as the material of the foam adhesive layer 3 (the thermoplastic material foam layer) of the laminate S, that is, the foam adhesive 17 which is applied to the intermediate substrate 15 in the step (vi) is explained.

The foam adhesive 17 may be an olefinic thermoplastic foam adhesive comprising a styrene-butadiene copolymer (styrene-butadiene rubber). The foam adhesive 17 preferably contains 3 to 10 wt. parts of the microcapsules containing a foaming agent and comprising a shell of a vinylidene chloride-acrylonitrile copolymer, per 100 wt. parts of the adhesive, and also the mixed solvent of toluene and cyclohexane. The foam adhesive 17 has a solid content of 30 to 60 wt. %.

The styrene-butadiene copolymer comprises an acid-modified styrene-butadiene-styrene copolymer and contains an isocyanate to crosslink the copolymer.

The weight ratio of vinylidene chloride to acrylonitrile in the vinylidene chloride-acrylonitrile copolymer is usually from 50:50 to 60:40.

The reason why the styrene-butadiene copolymer is preferably used as the main component of the foam adhesive 17 is as follows:

The peel strengths of the three laminates produced using the foam adhesive 17 comprising the styrene-butadiene copolymer, an acrylic polymer or chloroprene are as follows:

| | |
|---|---|
| 1) Styrene-butadiene copolymer: | 90 N/25 mm |
| 2) Acrylic polymer: | 47 N/25 mm |
| 3) Chloroprene: | 49 N/25 mm |

As can be seen from these results, it is preferable to use the thermoplastic olefin resin, in particular, the styrene-butadiene copolymer as the main component of the foam adhesive 17.

The reason why the microcapsules containing a foaming agent and comprising a shell of a vinylidene chloride-acrylonitrile copolymer are used as the foaming agent to be contained in the foam adhesive 17 is as follows:

The foaming microcapsules usually contain the encapsulated thermal decomposition type foaming agent in the resinous shells. Thus, the foaming agent cannot sufficiently foam unless the resinous capsules are softened in the heating and foaming step. The vinylidene chloride-acrylonitrile copolymer has a relatively low softening temperature (90 to 150° C.) in comparison with PP (having a softening temperature of 120 to 180° C.), and therefore it is suitable as the material of the foaming microcapsules.

The reason why the weight ratio of the vinylidene chloride to acrylonitrile (hereinafter referred to VdF/AN ratio) in the vinylidene chloride-acrylonitrile copolymer is set in the range between 50:50 and 60:40 will be explained.

Table 4 shows the results of the observation of the foaming conditions of the several foam adhesives 17 having different VdF/AN ratios.

TABLE 4

| VdF/AN ratio | Softening temperature (° C.) | Heating time (min.) | Heating temperature (° C.) | | | |
|---|---|---|---|---|---|---|
| | | | 80 | 90 | 100 | 110 |
| 0/100 | 110–150 | 2 | X | X | X | X |
| | | 4 | X | X | X | X |
| 40/60 | 110–150 | 2 | X | X | X | ○ |
| | | 4 | X | X | Δ | ○ |
| 50/50 | 100–140 | 2 | X | X | Δ | ○ |
| | | 4 | X | X | ○ | ○ |
| 60/40 | 90–120 | 2 | X | Δ | ○ | ○ |
| | | 4 | X | ○ | ○ | ○ |

In Table 4, "○" indicates that the foaming microcapsules are all foamed, "Δ" indicates that a part of the foaming microcapsules are foamed, and "X" indicates that no foaming capsule is foamed.

Although the results are not shown in Table 4, when the VdF/AN ratio was 70:30, the foaming microcapsules sedimented, and they were easily dissolved in the solvent.

According to the results in Table 4, when the VdF/AN ratio is in the range between 50:50 and 60:40, the vinylidene fluoride-acrylonitrile copolymers have relatively low softening points, and thus all the foaming microcapsules can be foamed at a relatively low temperature (100° C.).

The reason why the amount of the microcapsules is set in the range of 3 to 10 wt. parts per 100 wt. parts of the adhesive is explained below.

Table 5 shows the results of the observation of the foaming conditions of several foam adhesives 17 containing the different amounts of the foaming microcapsules and the measurement of the peel strength of the laminates S produced using such foam adhesives 17.

TABLE 5

| Amount of foaming microcapsules (microcapsules/ adhesive by weight) | Foaming condition | Peel strength (N/25 mm) |
| --- | --- | --- |
| 1/100 | No foaming | 68.16 |
| 3/100 | Good foaming | 64.43 |
| 5/100 | Good foaming | 44.03 |
| 10/100 | Good foaming | 21.18 |
| 15/100 | Foaming (with fragile interface) | Peeled at interface of skin material |
| 30/100 | Foaming (with fragile interface) | Peeled at interface of skin material |

In Table 5, "with fragile interface" is intended to mean that the interlayer structure of the laminate S between the layers which are adhered with the foam adhesive 17 is fragile.

According to the results shown in Table 5, the microcapsules are not foamed when the weight ratio of the microcapsules to the foam adhesive is less than 3/100, while the adhesive strength of the foam adhesive 17 decreases when the ratio of the microcapsules exceeds 10/100.

The reason why the mixed solvent of toluene and cyclohexane is preferably used in the foam adhesive 17, and the solid content of the adhesive 17 is adjusted in the range between 30 and 60 wt. % is as follows:

When no toluene is used, the sprayability of the adhesive deteriorates when the adhesive is applied in the step (vi), so that the adhesive layer 18 becomes less uniform. When no cyclohexane is used, the foaming microcapsules are dissolved in the solvent so that the foaming capsules lose the foaming ability.

Tables 6-1 and 6-2 show the results of the observations of the sprayability, applied states and foaming conditions, and the measurements of the thickness of the foamed layer of the foam adhesives 17 containing the mixed solvent of toluene and cyclohexane having varying weight ratios with the fixed solid content of 45.60% (Table 6-1), or the foam adhesives 17 containing the mixed solvent of toluene and cyclohexane in the weight ratio of 30:70 and having the different solid contents (Table 6-2).

TABLE 6-1

| Solid content = 45.60% | | | | | |
| --- | --- | --- | --- | --- | --- |
| cyclohexane | 70% | 80% | 90% | 100% | — |
| Toluene | 30% | 20% | 10% | 0% | 30% |
| Acetone | — | — | — | — | 70% |
| Sprayability | Good | Good | No good (cobwebbing) | No Good (Cobwebbing) | Good |
| Applied state | Good | Good | No good (nonuniform) | No good (nonuniform) | Good |
| Foaming condition | Good | Good | Good | Good | No foaming |
| Thickness of foamed layer (mm) *1) | 1.83 | 1.71 | 0.92 | 0.41 | 0.00 |

Note:
1) The foamed amount from the initial thickness.

TABLE 6-2

| Toluene:cyclohexane = 30:70 (by weight) | | | | | | |
| --- | --- | --- | --- | --- | --- | --- |
| Solid content | 20% | 30% | 40% | 50% | 60% | 70% |
| Volatile | 80% | 70% | 60% | 50% | 40% | 30% |
| Sprayability | No good | Good | Good | Good | Good | No good |
| Applied state | No good (sagging) | Good | Good | Good | Good | No good (nonuniform) |
| Foaming condition | No good (nonuniform) | Good | Good | Good | Good | No good (nonuniform) |

According to the results shown in Tables 6-1 and 6-2, it can be seen that when the solid content is less than 30 wt. % or exceeds 60 wt. %, the sprayability is not good. Furthermore, when the solid content is less than 30 wt. %, the adhesive layer 18 (applied adhesive) sags so that the foam layer having the sufficient thickness cannot be obtained. When the solid content exceeds 60 wt. %, the thickness of the adhesive layer 17 is less uniform.

The reason why the acid-modified styrene-butadiene-styrene copolymer compounded in the styrene-butadiene copolymer and the isocyanate is added to cross link the copolymers is that the heat-resistant stiffness and the heat-resistant adhesion strength of the foam adhesive layer 3 are improved.

It is preferable to add 3 to 10 wt. % of the terpene resin to the foam adhesive 17 to increase the adhesion properties of the adhesive 17. When the amount of the terpene resin added is less than 3 wt. %, the adhesion properties are not substantially increased. When the amount of the terpene resin added exceeds 10 wt. %, the physical properties of the foam adhesive layer 3 deteriorate.

The present invention will be illustrated by the following Examples, which do not limit the scope of the invention in any way.

EXAMPLE 1

In this Example, a laminate was produced, in which a polypropylene substrate, a foam adhesive layer, a thermoplastic olefin resin foam layer and a skin material of a thermoplastic olefin resin were laminated in this order.

The polypropylene substrate was produced by injection molding and had a thickness of 3 mm.

The foam adhesive was prepared by mixing 3 wt. parts of foaming beads with vinylidene chloride-acrylonitrile copolymer shells and 3 wt. parts of terpene phenol with 100 wt. parts of a base adhesive consisting of a styrene-butadiene copolymer added to cyclohexane.

A thermoplastic polyolefin elastomer was used as a resinous material to form the thermoplastic olefin resin foam layer and laminated on the skin material of the thermoplastic olefin resin by powder slush molding, followed by foaming with heating.

The skin material of the thermoplastic olefin resin was produced by powder slush molding the thermoplastic polyolefin elastomer and had a thickness of 1.2 mm. The total thickness of the powder slush molded foam layers was 2.0 mm.

The above foaming composition of the thermoplastic polyolefin elastomer was laminated on the back surface of the skin material by powder slush molding and foamed with heating to form the thermoplastic olefin resin foam layer. Then, the two-ply laminate of the skin material and the thermoplastic polyolefin resin foam layer was set on the lower mold so that the skin material faced the molding surface of the mold.

Separately, a foam adhesive was applied onto the surface of the polypropylene substrate and pre-heated to 60° C., and then the substrate was set on the upper mold so that the uncoated surface of the substrate faced the molding surface of the mold.

Next, the foam adhesive was heated with a hot-air oven at 110° C. for 5 minutes to foam the adhesive and the molds were closed until the clearance distance of the molds reached 1.4 mm followed by aging. Thereafter, the molds were cooled to room temperature and opened, and the molded laminate was removed from the molds.

The skin material and the substrate were firmly adhered. The initial peel strength (just after adhering) was 9.8 N/25 mm, and the embossed design on the skin material was not disturbed. The cushioning properties of the whole laminate were good.

EXAMPLE 2

A laminate was produced in the same manner as in Example 1 except that a composition of 100 wt. parts of a styrene-butadiene copolymer, 10 wt. parts of dinitrosopentamethylenetetramine (foaming agent), 10 wt. parts of an acid group-containing compound (salicylic acid) and 3 wt. parts of terpenephenol in cyclohexane was used as a foam adhesive, and the foam adhesive was foamed at 150° C. by heating with far-infrared ray.

The skin material and the substrate were firmly adhered, and the embossed design on the skin material was not disturbed. The cushioning properties of the whole laminate were good.

EXAMPLE 3

Tables 7 to 10 show the properties or natures of the laminates which were produced using various foam adhesives according to the present invention, and also those of the laminate produced using the conventional polyurethane foam adhesive.

As the properties of the laminates, the above-described peel strength (adhesion strength), heat resistance measured by heat resistant creep tests, short-term heat resistance, and dent recovery were used.

In Tables 7 to 10, "initial adhesion strength" means the peel strength just after the skin material and the substrate were laminated with the foam adhesive. "After 24 hour aging" means the peel strength after 24 hour aging from the lamination.

Here, the heat resistant creep test is briefly explained.

Figure 3:
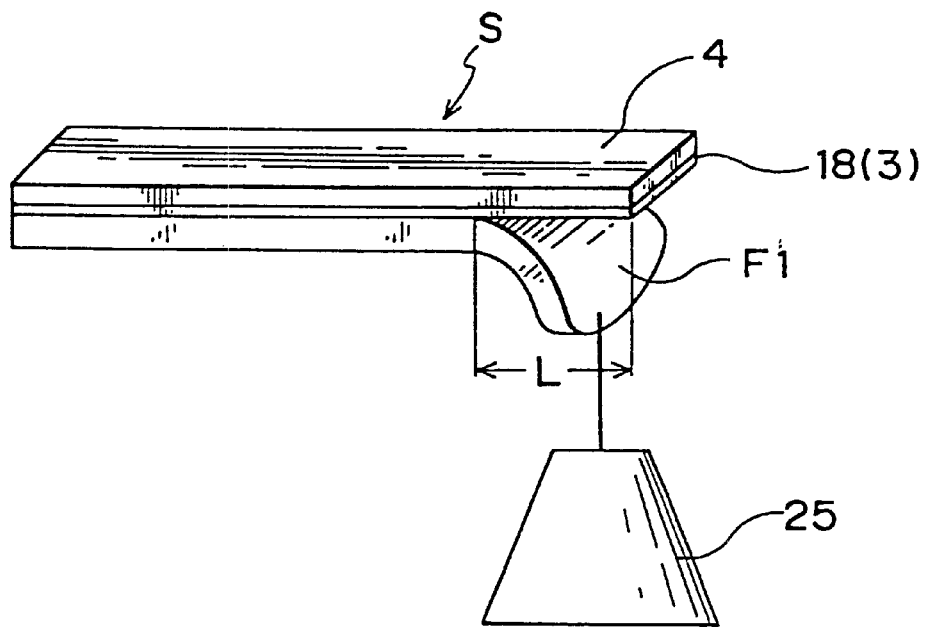
FIG. 3 shows a setup used in the heat-resistant creep test.

As shown in FIG. 3, a laminate S is produced by laminating the skin material F1 and the PP substrate F2 with the foam adhesive (the adhesive layer 18 and the foam adhesive layer 3). The laminate S is aged at room temperature for 3 days or 7 days. Then, the laminate S is held with the skin material F1 facing downwards, and the weight 25 (50 grams) is suspended at one end of the skin material F1. Then, the laminate is maintained at 95° C. for 1 hour. Thereafter, the length L of the skin material F1, which is peeled off from the substrate in the longitudinal direction, is measured. This peeled length is a measure for the heat resistance of the laminate S. The longer the peeled length, the lower the heat resistance.

In the above test, the adhered area was a rectangular of 25 mm×50 mm.

The short-term heat resistance is evaluated by applying the heat load twice and observing the change of the appearance of the skin material. The heat load consists of heating the skin material to 120° C. and then maintaining it at 80° C. In connection with the results of short-term heat resistance reported in Tables 7 to 10, "○" means that the appearance was not changed at all.

Figure 4:
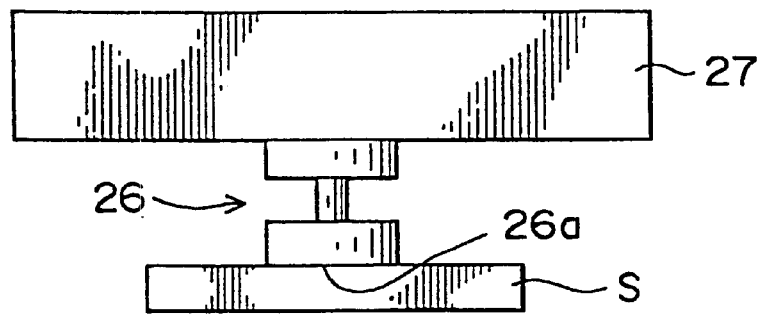
FIG. 4 shows an apparatus to measure the dent recovery.

The dent recovery is measured as follows:

As shown in FIG. 4, as a test piece, a laminate S having a size of 30 mm×30 mm is supplied, and its thickness is measured. The laminate S is heated at 90° C. for 30 minutes. Then, in an oven, a weight 27 of 2 kg is placed on the laminate S through a jig 26 for one minute. Here, the mated surface area 26a of the jig 26 against the laminate S is a circle with a diameter of 20 mm. Thereafter, the jig 26 and the weight 27 are removed, and the laminate S is maintained at room temperature for 30 minutes. After that, the thickness of the laminate S is measured and the difference from the initial thickness (the depressed depth) is calculated. This depressed depth is a measure of the dent recovery.

From the results reported in Tables 7 to 10, it can be understood the laminate of the present invention has much better adhesion strength, heat resistance and dent recovery than the laminate comprising the conventional polyurethane foam adhesive layer.

TABLE 7

| Formulation No. | 1 | 2 | 3 | 4 | 5 | 6 | 7 |
|---|---|---|---|---|---|---|---|
| Adhesive | | | | | | | |
| Main component A | SBR | SBR | SBR | SBR | SBR | SBR | SBR |
| Functional polymer B | — | — | — | — | — | Mod. SEBS[1)] | Mod. SBS[2)] |
| A:B (by wt.) | — | — | — | — | — | 8:2 | 8:2 |
| Tackifier | — | α-Pinene-terpene-phenol[3)] | Alkyl-phenol resin[4)] | Alkyl-phenol resin[4)] | Alkyl-phenol resin[4)] | Alkyl-phenol resin[4)] | Alkyl-phenol resin[4)] |
| Solvent | Cyclohexane/toluene | | | | | | |
| Foaming agent (% based on adhesive) | Vinylidene chloride (VdC)-acrylonitrile (AN) copolymer (60:40) (Type: F20D) (3 %) | | | | | | |
| Antioxidant | 2,6-di-tert.-butyl-p-cresol | | | | | | |
| Curing agent (per 100 wt. parts of main component A) | — | — | — | Poly-functional isocyanate | Crude MDI (5 parts) | Crude MDI (5 parts) | Crude MDI (5 parts) |

TABLE 7-continued

| Formulation No. | 1 | 2 | 3 | 4 | 5 | 6 | 7 |
|---|---|---|---|---|---|---|---|
| Defattting of skin material | No | No | No | No | No | No | No |
| TPO skin layer | Yes | Yes | Yes | Yes | Yes | Yes | Yes |
| TPO foam layer | Yes | Yes | Yes | Yes | Yes | Yes | Yes |
| Property | | | | | | | |
| Initial adhesion strength (N/25 mm) | 0.0 | 3.9 | 4.9 | — | — | — | 15.7 |
| After 24 hour aging (N/25 mm) | 0.5 | 10.3 | 15.7 | — | — | — | 34.6 |
| After heat treatment (N/25 mm) | — | — | — | — | — | — | — |
| Heat resistant creep test | — | Fallen | Fallen | Fallen | 5 mm | 15 mm | 1 mm |
| Foam thickness (mm) | — | — | — | — | — | — | 0.85 |
| Foaming condition | — | — | — | — | — | — | ○ |
| Short-term heat resistance | — | — | — | — | — | — | Swelled |
| Dent recovery (mm) | — | — | — | — | — | — | 1.05 |
| Softening point (° C.) | — | — | — | — | — | — | — |

Notes:
[1])Maleic anhydride-modified SEBS.
[2])Maleic anhydride-modified SBS.
[3])Manuractured by Yasuhara Chemical, Co., Ltd.
[4])Alkyl-phenol resin having free carboxyl groups and phenyl ester (Alresen ® 500R manufactured by Hoechst).
[5])MICROPEARL ® manufactured by Matsumoto Fat & Oil, Co., Ltd.

TABLE 8

| Formulation No. | 8 | 9 | 10 | 11 | 12 | 13 |
|---|---|---|---|---|---|---|
| Adhesive | | | | | | |
| Main component A | SBR | SBR | SBR | SBR | SBR | SBR |
| Functional polymer B | Mod. SBS[2]) | Mod. SBS[2]) | Mod. SBS[2]) | Mod. SBS[2]) | Mod. SBS[2]) | Mod. SBS[2]) |
| A:B (by wt.) | 8:2 | 8:2 | 8:2 | 8:2 | 8:2 | 7:3 |
| Tackifier | Alkyl-phenol resin[4]) | Alkyl-phenol resin[4]) | Alkyl-phenol resin[4]) | Alkyl-phenol resin[4]) | Alkyl-phenol resin[4]) | Alkyl-phenol resin[4]) |
| Solvent | Cyclohexane/toluene | | | | | |
| Foaming agent (% based on adhesive) | VdC-AN copolymer[5]) Type: F20D (5%) | VdC-AN copolymer[5]) Type: F20D (7%) | VdC-AN copolymer[5]) Type: F30D (3%) | VdC-AN copolymer[5]) Type: F30D (5%) | VdC-AN copolymer[5]) Type: F30D (7%) | VdC-AN copolymer[5]) Type: F30D (3%) |
| Antioxidant | 2,6-di-tert.-butyl-p-cresol | | | | | |
| Curing agent (per 100 wt. parts of main component A) | Crude MDI (5 parts) | Crude MDI (5 parts) | Crude MDI (5 parts) | Crude MDI (5 parts) | Crude MDI (5 parts) | Crude MDI (3 parts) |
| Defattting of skin material | No | No | No | No | No | No |
| TPO skin layer | Yes | Yes | Yes | Yes | Yes | Yes |
| TPO foam layer | Yes | Yes | Yes | Yes | Yes | Yes |
| Property | | | | | | |
| Initial adhesion strength (N/25 mm) | — | — | — | 6.4 | — | 8.4 |
| After 24 hour aging (N/25 mm) | — | — | 13.3 | 10.3 | — | 11.7 |
| After heat treatment (N/25 mm) | — | — | — | 65.2 | — | 52.8 |
| Heat resistant creep test | — | — | — | — | — | — |
| Foam thickness (mm) | 0.71 | 1.14 | 1.09 | 1.29 | 1.73 | 1.12 |
| Foaming condition | ○ | ○ | ○ | ○ | ○ | ○ |
| Short-term heat resistance | — | — | Swelled | Swelled | — | ○ |
| Dent recovery (mm) | — | — | 0.57 | 0.43 | — | 0.82 |
| Softening point (° C.) | — | — | — | — | — | — |

Notes:
[2])Maleic anhydride-modified SBS.
[4])Alkyl-phenol resin having free carboxyl groups and phenyl ester (Alresen ® 500R manufactured by Hoechst).
[5])MICROPEARL ® manufactured by Matsumoto Fat & Oil, Co., Ltd.

TABLE 9

| Formulation No. | 14 | 15 | 16 | 17 | 18 | 19 |
|---|---|---|---|---|---|---|
| Adhesive | | | | | | |
| Main component A | SBR | SBR | SBR | SBR | SBR | SBR |
| Functional polymer B | Mod. SBS[2)] | Mod. SBS[2)] | Mod. SBS[2)] | Mod. SBS[2)] | Mod. SBS[2)] | Mod. SBS[2)] |
| A:B (by wt.) | 7:3 | 7:3 | 7:3 | 7:3 | 7:3 | 8:2 |
| Tackifier | Alkyl-phenol resin[4)] | Alkyl-phenol resin[4)] | Alkyl-phenol resin[4)] | Alkyl-phenol resin[4)] | Alkyl-phenol resin[4)] | Alkyl-phenol resin[4)] |
| Solvent | Cyclohexane/toluene | | | | | |
| Foaming agent (% based on adhesive) | VdC-AN copolymer[5)] Type: F30D (5%) | VdC-AN copolymer[5)] Type: F30D (7%) | VdC-AN copolymer[5)] Type: F30D (3%) + Coupling agent | VdC-AN copolymer[5)] Type: F30D (5%) + Coupling agent | VdC-AN copolymer[5)] Type: F30D (7%) + Coupling agent | VdC-AN copolymer[5)] Type: F30D (5%) |
| Antioxidant | 2,6-di-tert.-butyl-p-cresol | | | | | |
| Curing agent (per 100 wt. parts of main component A) | Crude MDI (3 parts) | Crude MDI (3 parts) | Crude MDI (3 parts) | Crude MDI (3 parts) | Crude MDI (3 parts) | Crude MDI (3 parts) |
| Defattting of skin material | No | No | No | No | No | No |
| TPO skin layer | Yes | Yes | Yes | Yes | Yes | Yes |
| TPO foam layer | Yes | Yes | Yes | Yes | Yes | Yes |
| Property | | | | | | |
| Initial adhesion strength (N/25 mm) | 4.9 | 4.4 | 8.1 | 10.1 | 7.6 | 7.3 |
| After 24 hour aging (N/25 mm) | 8.6 | 8.3 | — | — | — | — |
| After heat treatment (N/25 mm) | 72.8 | 42.2 | — | — | — | — |
| Heat resistant creep test | — | — | — | — | — | — |
| Foam thickness (mm) | 1.83 | 3.61 | 1.00 | 1.98 | 2.38 | 1.65 |
| Foaming condition | ○ | ○ | ○ | ○ | ○ | ○ |
| Short-term heat resistance | ○ | ○ | — | — | — | — |
| Dent recovery (mm) | 0.77 | 0.31 | 0.28 | 0.22 | 1.07 | — |
| softening point (° C.) | — | — | — | — | — | — |

Notes:
[2)]Maleic anhydride-modified SBS.
[4)]Alkyl-phenol resin having free carboxyl groups and phenyl ester (Alresen ® 500R manufactured by Hoechst).
[5)]MICROPEARL ® manufactured by Matsumoto Fat & Oil, Co., Ltd.

TABLE 10

| Formulation No. | 20 | 21 | 22 | 23 | 24 | 25 |
|---|---|---|---|---|---|---|
| Adhesive | | | | | | Poly-urethane adhesive |
| Main component A | SBR | SBR | SBR | SBR | SBR | |
| Functional polymer B | Mod. SBS[2)] | Mod. SBS[2)] | Mod. SBS[2)] | Mod. SBS[2)] | Mod. SBS[2)] | |
| A:B (by wt.) | 8:2 | 6:4 | 6:4 | 8:2 | 6:4 | |
| Tackifier | Alkyl-phenol resin[4)] | Alkyl-phenol resin[4)] | Alkyl-phenol resin[4)] | Alkyl-phenol resin[4)] | Alkyl-phenol resin[4)] | |
| Solvent | Cyclohexane/toluene | | | | | |
| Foaming agent (% based on adhesive) | VdC-AN copolymer[5)] Type: F30D (5%) | VdC-AN copolymer[5)] Type: F30D (5%) | VdC-AN copolymer[5)] Type: F30D (5%) + Coupling agent | VdC-AN copolymer[5)] Type: F30D (5%) | VdC-AN copolymer[5)] Type: F30D (5%) | |
| Antioxidant | 2,6-di-tert.-butyl-p-cresol | | | | | |
| Curing agent of main component A (per 100 wt. parts) | Crude MDI (3 parts) | Crude MDI (3 parts) | Crude MDI (3 parts) | Crude MDI (3 parts) | Crude MDI (3 parts) | |
| Defattting of skin material | Yes | Yes | Yes | Yes | Yes | |
| TPO skin layer | Yes | Yes | Yes | Yes | Yes | |
| TPO foam layer | Yes | Yes | Yes | No | No | |

TABLE 10-continued

| Formulation No. | 20 | 21 | 22 | 23 | 24 | 25 |
|---|---|---|---|---|---|---|
| Property | | | | | | |
| Initial peel strength (N/25 mm) | 18.2 | 20.7 | 19.5 | 11.0 | 19.1 | 1.0 |
| After 24 hour aging (N/25 mm) | — | — | — | — | — | 2.9 |
| After heat treatment (N/25 mm) | — | — | — | — | — | 9.8 |
| Heat resistant creep test | — | — | — | — | — | — |
| Foam thickness (mm) | 1.65 | 1.83 | 1.98 | 1.55 | 1.88 | ○○ |
| Foaming condition | ○ | ○ | ○ | ○ | ○ | ○○ |
| Short-term heat resistance | — | — | — | — | — | ○ |
| Dent recovery (mm) | — | — | — | — | — | 0.00 |
| Softening point (° C.) | 84.9 | 90.6 | 93.2 | — | — | — |

Notes:
[2])Maleic anhydride-modified SBS.
[4])Alkyl-phenol resin having free carboxyl groups and phenyl ester (Alresen ® 500R manufactured by Hoechst).
[5])MICROPEARL ® manufactured by Matsumoto Fat & Oil, Co., Ltd.

What is claimed is:

1. A thermoplastic foam adhesive comprising
   a styrene-butadiene rubber,
   3 to 10 wt. parts of microcapsules which contains a foaming agent and comprises a shell of a vinylidene chloride-acrylonitrile copolymer per 100 wt. parts of the adhesive, and
   a mixed solvent of toluene and cyclohexane wherein said adhesive has a solid content of 30 to 60 wt. %.

2. The thermoplastic foam adhesive according to claim 1, wherein said styrene-butadiene rubber comprises an acid-modified styrene-butadiene-styrene copolymer, and an isocyanate which crosslinks said copolymer.

3. The thermoplastic foam adhesive according to claim 1, wherein the weight ratio of vinylidene chloride to acrylonitrile in said vinylidene chloride-acrylonitrile copolymer is from 50:50 to 60:40.

* * * * *